United States Patent
Karlsen

(10) Patent No.: US 10,406,630 B1
(45) Date of Patent: Sep. 10, 2019

(54) MULTI-BEAM LASER PROCESSING WITH DISPERSION COMPENSATION

(71) Applicant: nLIGHT Photonics Corporation, Vancouver, WA (US)

(72) Inventor: Scott R. Karlsen, Battle Ground, WA (US)

(73) Assignee: nLIGHT, Inc., Vancouver, WA (US)

( * ) Notice: Subject to any disclaimer, the term of this patent is extended or adjusted under 35 U.S.C. 154(b) by 691 days.

(21) Appl. No.: 14/939,836

(22) Filed: Nov. 12, 2015

Related U.S. Application Data

(60) Provisional application No. 62/082,543, filed on Nov. 20, 2014.

(51) Int. Cl.
| | |
|---|---|
| *B23K 26/00* | (2014.01) |
| *B23K 26/06* | (2014.01) |
| *G02B 27/00* | (2006.01) |
| *G02B 3/04* | (2006.01) |
| *G02B 27/16* | (2006.01) |
| *G02B 26/10* | (2006.01) |
| *G02B 13/00* | (2006.01) |

(Continued)

(52) U.S. Cl.
CPC ........ *B23K 26/0648* (2013.01); *B23K 26/067* (2013.01); *B23K 26/073* (2013.01); *B23K 26/082* (2015.10); *G02B 3/04* (2013.01); *G02B 13/0005* (2013.01); *G02B 26/105* (2013.01); *G02B 27/0037* (2013.01); *G02B 27/1093* (2013.01); *G02B 27/16* (2013.01)

(58) Field of Classification Search
CPC .............. B23K 26/0648; B23K 26/064; B23K 26/082; B23K 26/067; B23K 26/073; G05B 3/04; G05B 13/0005; G05B 26/105; G05B 27/0037; G05B 27/0093; G05B 27/16

USPC ............................ 219/121.75, 121.73, 121.8
See application file for complete search history.

(56) References Cited

U.S. PATENT DOCUMENTS

| | | | |
|---|---|---|---|
| 4,176,925 A | | 12/1979 | Kocher et al. |
| 4,815,067 A | * | 3/1989 | Webster ............... G11B 7/0031 369/97 |

(Continued)

FOREIGN PATENT DOCUMENTS

| | | |
|---|---|---|
| CN | 101055431 | 10/2007 |
| JP | 2009021597 | 1/2009 |
| KR | 100225696 | 10/1999 |

OTHER PUBLICATIONS

Michael Bass (Editor-in-chief), Chapter 30 "Scanners", Handbook of Optics 30:35-30:36, McGraw Hill, New York (2010).

(Continued)

*Primary Examiner* — Mark H Paschall
(74) *Attorney, Agent, or Firm* — Klarquist Sparkman, LLP

(57) ABSTRACT

A multi-beam laser material processing system for processing a target includes a beam splitting system situated to receive an input beam, the beam splitting system including a beam splitter situated to receive and split the input beam into a plurality of subbeams, a focus lens situated to receive the subbeams and cause the subbeams to converge, a zoom lens system situated to receive the subbeams and adjust the magnification of the subbeams at the target, and a dispersion compensation system situated to receive the subbeams and compensate for dispersion associated with the subbeams, the dispersion compensation system including a negative diffractive lens and a positive diffractive lens.

20 Claims, 4 Drawing Sheets

(51) Int. Cl.
  *G02B 27/10* (2006.01)
  *B23K 26/067* (2006.01)
  *B23K 26/073* (2006.01)
  *B23K 26/082* (2014.01)

(56) References Cited

U.S. PATENT DOCUMENTS

| | | | |
|---|---|---|---|
| 5,214,528 A | | 5/1993 | Akanabe et al. |
| 5,629,799 A | * | 5/1997 | Maruyama ............... G02B 3/04 |
| | | | 359/565 |
| 6,028,711 A | * | 2/2000 | Adachi ................. G02B 13/24 |
| | | | 359/642 |
| 6,245,590 B1 | | 6/2001 | Wine et al. |
| 6,347,171 B1 | | 2/2002 | Tatah et al. |
| 6,552,301 B2 | | 4/2003 | Herman et al. |
| 6,686,586 B2 | | 2/2004 | Check |
| 6,720,519 B2 | | 4/2004 | Liu et al. |
| 7,227,115 B2 | | 6/2007 | Check |
| 7,366,378 B2 | | 4/2008 | Jia et al. |
| 7,397,596 B2 | | 7/2008 | Yacoubian |
| 7,534,994 B2 | | 5/2009 | Check |
| 7,666,759 B2 | * | 2/2010 | Couch .................... B23K 26/03 |
| | | | 219/121.69 |
| 7,947,968 B1 | * | 5/2011 | Markle ............. B23K 26/0643 |
| | | | 250/492.1 |
| 8,178,818 B2 | | 5/2012 | Baird et al. |
| 2003/0043441 A1 | | 3/2003 | Azami et al. |
| 2003/0140806 A1 | | 7/2003 | Sandstrom |
| 2006/0065640 A1 | | 3/2006 | Lizotte et al. |
| 2006/0119692 A1 | | 6/2006 | Yang et al. |
| 2006/0205121 A1 | | 9/2006 | Couch et al. |
| 2007/0295921 A1 | | 12/2007 | Check |
| 2009/0109561 A1 | | 4/2009 | Cook |
| 2009/0242522 A1 | | 10/2009 | Baird et al. |
| 2010/0142757 A1 | | 6/2010 | Sandstrom et al. |
| 2011/0210105 A1 | | 9/2011 | Romashko et al. |
| 2011/0216302 A1 | | 9/2011 | Luberek |

OTHER PUBLICATIONS

Coffey, "Ultrafast & Ultrashort Some Recent Advances in Pulsed Lasers," *Optics & Photonics News*, 8 pages (May 2014).
First Office Action (with English translation) from related Chinese Application No. 10-2014-10237270.4, dated Aug. 5, 2015, 4 pages.
Lee, "Demonstration of Optical Tunable Dispersion Compensation with a Virtually-Imaged Phased-Array Based Pulse Shaper," A Thesis Submitted to the Faculty of Purdue University, 125 pages (Aug. 2006).
Mínguez-Vega et al., "High spatiotemporal resolution in multifocal processing with femtosecond laser pulses," *Optics Letters*, 31(17):2631-2633 (Sep. 1, 2006).
Notice of Preliminary Rejection (with English translation) from related Korean Application No. 10-2014-0070756, dated Sep. 30, 2015, 7 pages.
Rodríguez et al., "Ultrafast beam shaping with high-numerical-aperture microscope objectives," *Optics Express*, 15(23):15308-15313 (Nov. 12, 2007).
"Galvanometer," Https://en.Wikipedia.org/wiki/Galvanometer, 6 pages. Wikipedia, Author unknown, Downloaded Jun. 30, 2017. "Exhibit A".
Mitchell, et al., "Fast Steering Mirror Technology: Active Beam Stabilization," Application Note, Opto-Mechanics 2, Newport Corporation, 7 pages (Jan. 2001).
Notice of Allowance (with English translation) from related Chinese Application No. 201410237270.4, dated Nov. 3, 2016, 4 pages.
Notice of Allowance (with English translation) from related Korean Application No. 10-2014-0070756, dated Nov. 10, 2016, 3 pages.
"Voice Coil Positioning Stage Specifications", 2 pages. Downloaded from https://www.h2wtech.com/pdf/2014-06-02-23-11-26. PDF Jun. 30, 2017. H2W Technologies, Inc., Author unknown, (Dec. 2011).
Notice of Preliminary Rejection (with English translation) from related Korean Application No. 10-2014-0070756, dated Apr. 26, 2016, 8 pages.
Second Office Action (with English translation) from related Chinese Application No. 10-2014-10237270.4, dated Mar. 10, 2016, 8 pages.

* cited by examiner

MULTI-BEAM LASER PROCESSING WITH DISPERSION COMPENSATION

CROSS REFERENCE TO RELATED APPLICATION

This application claims the benefit of U.S. Provisional Application 62/082,543, filed Nov. 20, 2014, which is incorporated herein by reference.

FIELD

Generally, the field of the present invention is multi-beam laser processing. More particularly, the present invention relates to the multi-beam laser processing with dispersion compensation.

BACKGROUND

In recent years, laser processing has become more popular as equipment costs have decreased and a greater appreciation has been obtained of the benefits of coherent light sources. In particular, the material processing of different targets can be enhanced by using multiple beams split off of one or more incident input beams. In this way one or a few light sources can be used to simultaneously process multiple similar or identical features, offering the potential for dramatic increases in productivity and reduced cost. However, in the process of splitting a beam into multiple beams, various aberrations can cause error to be introduced into the image shape of the multiple beams.

It has been found herein that for very short pulse input beams, dispersion can be introduced causing spatial and temporal broadening which can distort the shape of the imaged beams at the processing target. Additionally, pincushion or other distortions can be introduced which can lead to undesirable shifts in the position of different ones of the multiple beams. Despite the persistence of various obstacles in the art of multi-beam laser processing, solutions allowing the successful construction of multi-beam laser processing systems have not been forthcoming. Accordingly, needs remain for improved systems.

SUMMARY

According to one aspect of the disclosed technology, a multi-beam laser material processing system for processing a target is provided, the system including a beam splitting system situated to receive an input beam, the beam splitting system including a beam splitter situated to receive and split the input beam into a plurality of subbeams, a focus lens situated to receive the subbeams and cause the subbeams to converge, a zoom lens system situated to receive the subbeams and adjust the magnification of the subbeams at the target, and a dispersion compensation system situated to receive the subbeams and compensate for dispersion associated with the subbeams, the dispersion compensation system including a negative diffractive lens and a positive diffractive lens. In some examples, distortion associated with the subbeams can be corrected with the optics of the dispersion compensating system.

According to another aspect of the disclosed technology, a multi-beam laser material processing system for processing a target includes a laser system situated to provide a pulsed input beam, each pulse of the pulsed input beam having a pulse-width of less than about 1000 fs, a diffractive optical element coupled to the pulsed input beam, the diffractive optical element situated to diffract the pulsed input beam into a plurality subbeams for focusing at the target into a plurality spots forming a two-dimensional subbeam array, a zoom lens coupled to the diffracted pulsed input beam and situated to controllably adjust the magnification of the subbeam array, the zoom lens including a dispersion compensation system situated to receive the diffracted pulsed input beam and correct for dispersion effects introduced into the subbeam array by the diffractive optical element, the dispersion compensation system including a focus lens for causing the diffracted pulsed input beam to converge and a negative diffractive lens and positive diffractive lens pair for correcting the dispersion effects, a scanning system coupled to the diffracted pulsed input beam and situated to controllably translate the subbeam array transverse to the direction of subbeam propagation at the target, and an f-theta lens coupled to the scanned diffracted pulsed input beam and situated to focus the subbeam array at the target across a range of positions transverse to the direction of subbeam propagation. In some examples, distortion associated with the subbeams can be corrected with the optics of the dispersion compensating system.

According to another aspect of the disclosed technology, a method of multi-beam laser material processing a target, includes steps of generating a pulsed laser beam suitable for femtosecond laser material processing, diffracting the pulsed laser beam to form a spaced subbeam array of femtosecond laser spots at the target, magnifying or demagnifying the diffracted pulsed laser beam to controllably adjust the size of the subbeam array at the target, compensating for subbeam dispersion causing subbeam position error at the target, and scanning the diffracted pulsed laser beam across the target in order to parallel laser process a pattern with a predetermined spacing at the target. In some examples, further steps are included for correcting distortion associated with the subbeams.

The foregoing and other objects, features, and advantages will become more apparent from the following detailed description, which proceeds with reference to the accompanying figures.

DETAILED DESCRIPTION

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items.

The systems, apparatus, and methods described herein should not be construed as limiting in any way. Instead, the present disclosure is directed toward all novel and non-obvious features and aspects of the various disclosed embodiments, alone and in various combinations and subcombinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

In some examples, values, procedures, or apparatus' are referred to as "lowest", "best", "minimum," or the like. It will be appreciated that such descriptions are intended to indicate that a selection among many used functional alternatives can be made, and such selections need not be better, smaller, or otherwise preferable to other selections. Herein, dispersion and dispersion effects are described which generally relate to an optical frequency dependent phase velocity that results in a spatial and temporal broadening of optical pulses. Distortion and distortion effects are also described which generally relate to a position error for focused subbeam spots in relation to a desired subbeam spot position. In typical examples, distortions include pincushion, barrel, irregular, etc.

Figure 1:
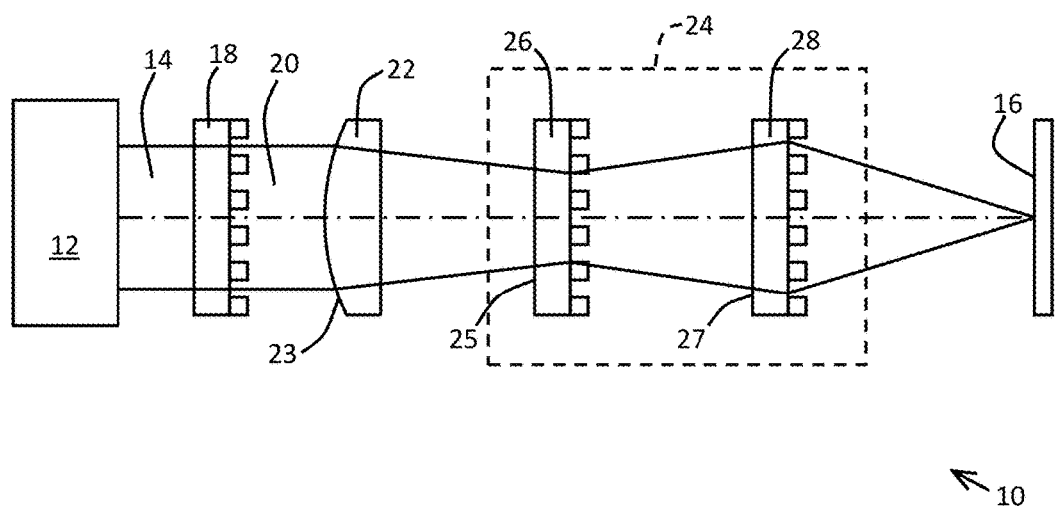
FIG. 1 is a schematic of one example of a multi-beam laser processing system.

Referring now to FIG. 1, a multi-beam laser system 10 for laser-based materials processing and patterning is shown. The system 10 includes a femtosecond laser system 12 operable to produce an optical beam 14 of optical pulses of a predetermined pulse width or widths and predetermined pulse repetition rate or rates for precision laser processing of a target 16. The optical beam 14 is received by a beam splitter 18 which is operable to produce a plurality of subbeams 20 which can be focused at the target 16 for parallel laser processing of the target 16. A focus lens 22, which can be achromatic in some examples herein, is optically coupled to the plurality of subbeams 20 and causes the subbeams 20 to begin to converge as convergent subbeams 21 at the target 16.

Figure 2:
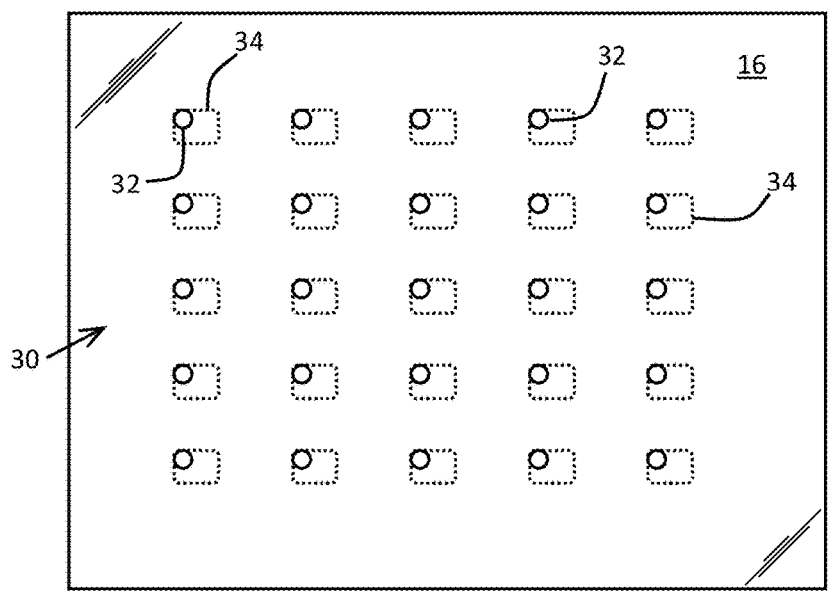
FIG. 2 is a view of a target being process by multiple beams.

With additional reference to FIG. 2, a view of the target 16 is shown that is being processed by the plurality of subbeams 20. A dispersion compensation system 24 is optically coupled to the plurality of subbeams 20 prior to the subbeams 20 impacting the target 16 and is operable to correct for dispersion effects introduced into the subbeams 20 by the beam splitter 18. Without correction, such dispersion effects cause the focused spots of the convergent subbeams 21 to arrive at the target 16 in an undesirable way.

In preferred examples the subbeams 20 arrive at the target 16 in an evenly spaced pattern 30. In some examples, the pattern 30 can have another predetermined spacing that is other than evenly spaced. The subbeams 20 form spots 32 at the target 16 and can be translated transversely across the target surface to form larger processed features 34. Thus, a number of larger features 34 can be created simultaneously at the target 16 in accordance with the number of subbeams 20 which can be correctly focused at the target 16. In some examples, more than fifty subbeams 20 are used to form pattern 30 and in other examples more than one hundred subbeams 20 are used to form pattern 30. After the larger features 34 are successfully laser processed at the target 16, the array of subbeams 20 can be translated to a new position to process another set of larger features 34. In order to precision process larger features 34 across the entirety of the pattern, each subbeam 20 must arrive at the target 16 with a high degree of accuracy, with tolerances for spot size and spot spacing on the order of microns or smaller.

Particularly for increased diffraction orders, dispersion changes the shape of the pulsed subbeam 20 into an elliptical shape which spatially spreads and reduces the subbeam pulse energy density. Also, subbeams 20 can arrive at the target displaced from an evenly spaced or other suitably spaced pattern. A transverse displacement of the spot at the target of even a few µm can be unsuitable for high precision processing purposes, which can eliminate the usefulness of a laser patterning process altogether. Dispersive effects can also cause femtosecond pulsed subbeams 20 to become temporally stretched in relation to the spectral breadth of the pulses and the attendant variability in group delay for different frequencies. Temporal broadening can exacerbate the detrimental effects associated with spatial changes to pulses as different transverse spatial portions of a pulse can arrive at the target at significantly different times.

The dispersion compensation system 24 includes a negative diffractive lens 26 and a positive diffractive lens 28 which are selected to provide dispersion correction at the target 16 based on the spectral content of the femtosecond input optical beam 14 and the pattern of subbeams formed by the beam splitter 18. In preferred examples, the beam splitter 18 is a diffractive optical element which is operable to diffract the input beam 14 into the multiple subbeams 20. In some examples, further detrimental positional errors can be seen with subbeams and can be associated with a distortion effect that is separate from the aforementioned dispersion effects. Such distortions, which can be on the order of a few µm, can be hidden by errors associated with dispersion or other optical effects and can be advantageously corrected through an aspheric feature 23, 25, 27 applied to one or more of the focus lens 22, negative diffractive lens 26, or positive diffractive lens 28. The aspheric feature 23, 25, 27 can have various forms, including in some examples a shape, spacing, or other feature that uses a polynomial to describe the phase imparted by the lens. The phase is usually a function of radial distance 'r' from the center of the lens. A spherical lens imparts a phase change that is proportional to $r^2$, whereas an aspheric lens has additional polynomial terms that include $r^3$, $r^4$, and other higher orders. The aspheric feature can also be a freeform feature, where the phase changes differently in the X and Y axis of the lens so that the lens is asymmetric about the optical axis. In some examples, the negative and positive diffractive lenses 26, 28 have a flat surface with diffractive features formed thereon, the aspheric feature 25, 27 can be applied in relation to the spacings or pattern of the diffractive features.

Figure 3:
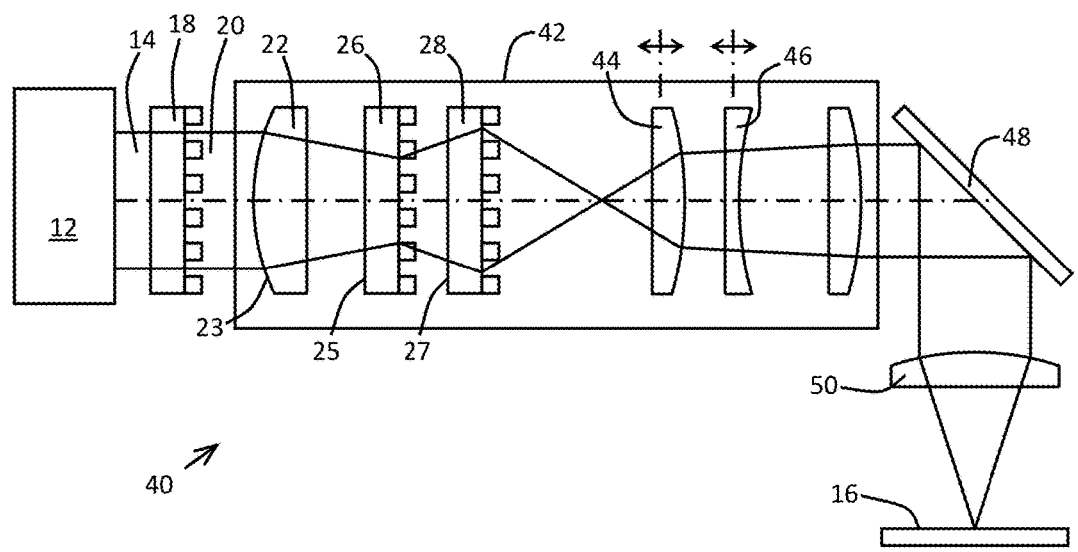
FIG. 3 is a schematic of another example of a multi-beam laser processing system.

In FIG. 3 another embodiment of a multi-beam laser processing system 40 is shown. The system 40 includes a femtosecond laser source 12 providing a pulsed input beam 14 which is optically coupled to a beam splitter 18 which diffracts the optical beam into a plurality of subbeams 20. A zoom lens system 42 receives the subbeams 20 and produces diffracted and zoomed subbeams 20' by controllably adjusting the magnification of the subbeams 20 with movable zoom optics 44, 46. The focused subbeams 21 at the target 16 can thereby be adjusted to suit the desired feature size or spacing associated with particular target requirements or specifications, such as thickness, composition, reflectivity, process type, etc. The zoom lens system 42 also includes dispersion compensating optics, including focus lens 22, negative diffractive lens 26, and positive diffractive lens 28. A distortion associated with the subbeams 20 that is separate from the dispersion can be conveniently corrected through an aspheric feature 23, 25, 27 applied to the focus lens 22, negative diffractive lens 26, or the positive diffractive lens 28. In preferred examples, the distortion correction can be applied with the one or more of the diffractive lenses 26, 28 without affecting the focus lens 22 thereby allowing the focus lens 22 to remain of simpler and more robust construction. For example, in some systems focus lens 22 can be achromatic or it can lack achromaticity, and chromatic aberrations associated therewith can be corrected in the diffractive lenses 26, 28.

The diffracted and zoomed subbeams 20' are scanned by a reflective scanning system 48 such as a galvo-scanner. The scanning of subbeams 20' allows for multiple identical features to be processed simultaneously in accordance with the number subbeams 21 focused at the target 16. Furthermore, scanning allows separate sets of features to be processed such that the subbeams 20 can be deenergized and the focused subbeams 21 translated transverse to the direction of beam propagation to a new position. With the controllability of the zoom lens system 42, a subsequent set of features on the target 16 can be processed that has the same or a different spacing between features created by the subbeams 20. An f-theta lens 50 is optically coupled to the scanning system 48 and operable to provide the scanned focused subbeams 21 at the target 16 across a range of positions transverse to the direction of subbeam propagation. In some examples, the scanning system 48 can include galvo-scanning components for larger subbeam translations, such as the movement of the subbeams to a new adjacent pattern position separate from the previous position. A piezo-based scanner can be coupled to the mirrors for finer control of the spots of the focused subbeams 21 for processing areas proximate to a selected pattern position.

Figure 4:
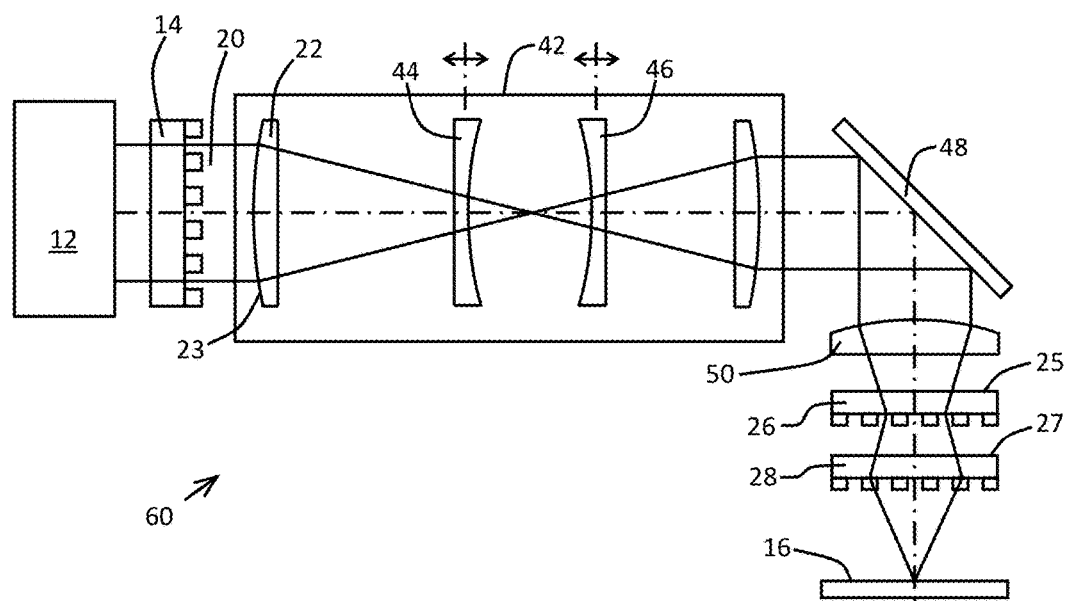
FIG. 4 is a schematic of another example of a multi-beam laser processing system.

In another embodiment shown in FIG. 4, a multi-beam laser processing system 60 also includes a femtosecond laser source 12 configured to provide femtosecond optical pulses to a beam splitter 14 operable to diffract the femtosecond pulse into a plurality of pulsed subbeams 20. The subbeams 20 are optically coupled into a zoom lens system 42 which is operable to adjust the magnification of the subbeams 20 focused to spots at the target 16. A focus lens 22 is situated in the zoom lens system 42 and is operable to converge the diffracted subbeams 20 therein. Movable optics 44, 46 are disposed in the zoom lens system 42 and can be translated along the propagation path of the subbeams 20 in order to adjust the magnification of the subbeams 20. Scanning system 48 is coupled to diffracted and zoomed subbeams 20' and is operable to controllably change the direction of the subbeams 20' in order to translate the spots of convergent subbeams 21 across the surface of the target 16 to be processed. An f-theta lens 50 receives the scanned subbeams 20' and focuses the subbeams 20' to the target 16 and allows the subbeam spots to remain focused at the target surface across a range of positions transverse to the direction of beam propagation. Dispersion compensating optics, including a negative diffractive lens 26 and a positive diffractive lens 28 are disposed between the f-theta lens 50 and target 16 and are operable to correct for dispersion associated with the subbeams 20. Distortion effects associated with the subbeams 20, and that is separate from the dispersion, can be conveniently corrected through an aspheric feature applied to one or more of the focus lens 22, the negative diffractive lens 26, and positive diffractive lens 28.

Figure 5:
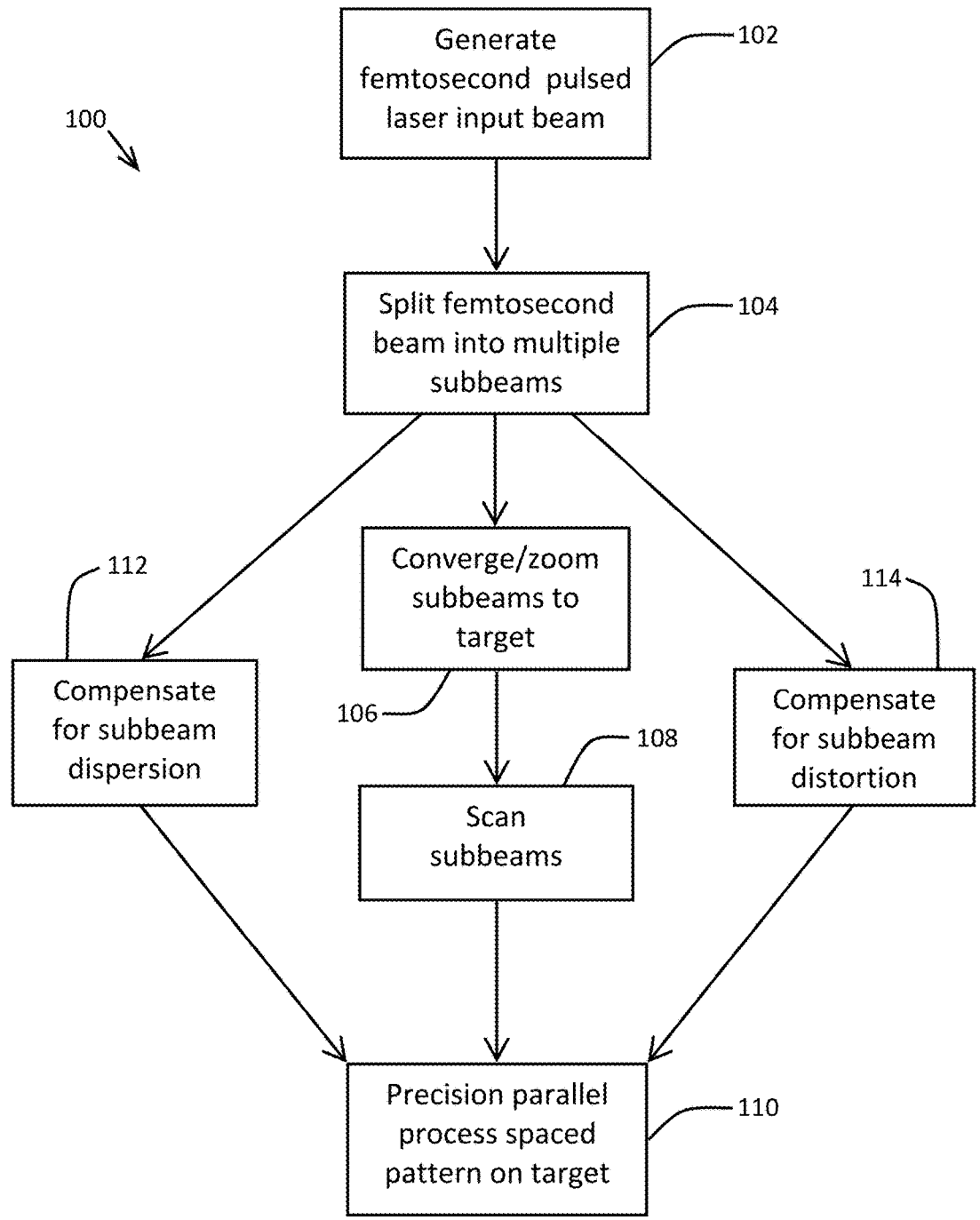
FIG. 5 is a flowchart of an example method.

Referring to FIG. 5 there is shown an exemplary method for multi-beam laser processing 100 with a femtosecond pulsed laser source. The particular embodiment illustrated should not be construed as limiting, as the disclosed method acts can be performed alone or with any subcombination of the method acts, in different orders, or at least partially simultaneously with one another. Further, any of the disclosed methods or method acts can be performed with any other methods or method acts disclosed herein. In method act 102, a femtosecond pulsed laser beam is generated with a femtosecond pulsed laser source. In method act 104, the pulsed laser beam is diffracted with a beam splitter into a plurality of component subbeams. In method act 106, the subbeams are converged and controllably zoomed for focusing the subbeams at a target with a predetermined size and spacing between subbeams. At method act 108, the subbeams are scanned to change the transverse position of the subbeams at the target to be processed. In a processing act 110, the scanned subbeams parallel process a spaced pattern on the target in accordance with the number of subbeams created in method act 104. During process 100, method act 112 compensates for dispersion associated with the subbeams, causing ellipticity in the subbeam spots formed at the target, and introduced by the splitting of the pulsed laser beam into multiple subbeams in method act 104. In a separate method act 114, distortion associated with the subbeams is compensated.

Figure 6:
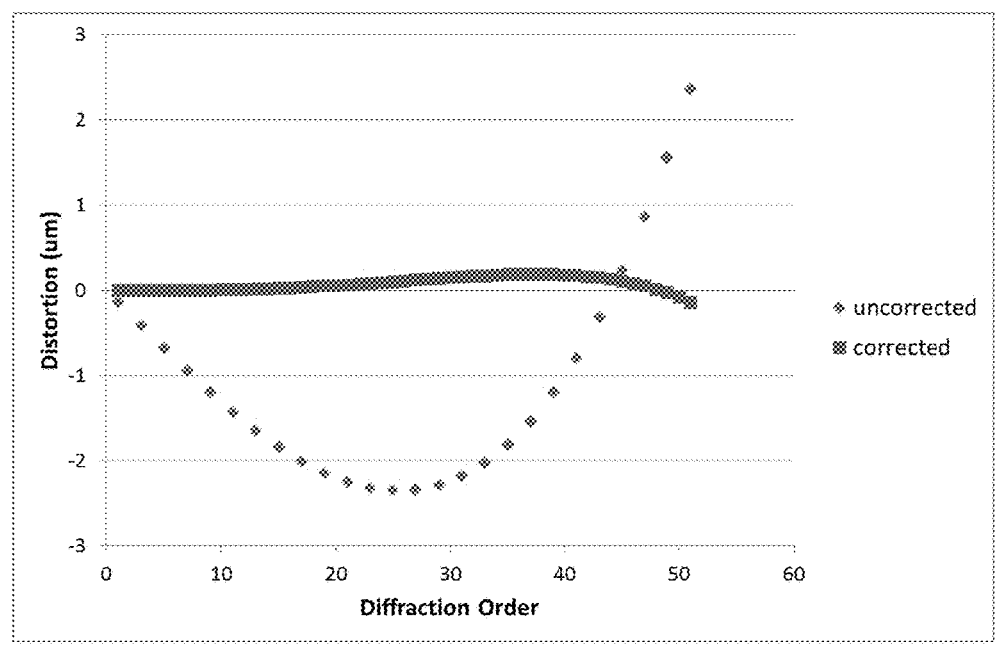
FIG. 6 is a chart showing a distortion improvement across multiple diffraction orders.

FIG. 6 shows a chart of distortion correction associated with the embodiment shown in FIG. 3. In the chart, subbeam spots for half of the diffraction orders of a one hundred and one diffraction order beam splitter are plotted to demonstrate position error of the subbeam spots associated with distortion. Without distortion correction, a distortion error that varies from about −2.5 µm to about 2.5 µm can be seen for the corresponding diffracted subbeams imaged at a target. Aspheric features 25, 27 are applied to the negative and positive diffractive lenses 26, 28 respectively. The negative and positive diffractive lenses 26, 28 are thus configured to reduce dispersion effects associated with the subbeams and also to reduce distortion error to less than about ±0.2 µm for the subbeams at the target.

In view of the many possible embodiments to which the principles of the disclosed technology may be applied, it should be recognized that the illustrated embodiments are only representative examples and should not be taken as limiting the scope of the disclosure. Alternatives specifically addressed in these sections are merely exemplary and do not constitute all possible alternatives to the embodiments described herein. For instance, various components of systems described herein may be combined in function and use. We therefore claim all that comes within the scope and spirit of the appended claims.

I claim:

1. A multi-beam laser material processing system for processing a target, comprising:
    a beam splitting system situated to receive an input beam, the beam splitting system including a beam splitter situated to receive and split the input beam into a plurality of subbeams, a focus lens situated to receive the subbeams and cause the subbeams to converge, a zoom lens system situated to receive the subbeams and adjust the magnification of the subbeams at the target, and a dispersion compensation system situated to receive the subbeams and compensate for dispersion associated with the subbeams, the dispersion compensation system including a negative diffractive lens and a positive diffractive lens;

wherein a distortion associated with the subbeams that produces a diffraction order dependent position error at the target that is separate from the dispersion is corrected through an aspheric feature applied to one or more of the focus lens, the positive diffractive lens, or the negative diffractive lens.

2. The system of claim 1, wherein the dispersion compensation system is situated in the zoom lens system.

3. The system of claim 1, further comprising a scanning system coupled to the plurality of subbeams and situated to scan the subbeams across the target.

4. The system of claim 3, wherein the scanning system is a galvo scanning system.

5. The system of claim 3, wherein the scanning system includes a galvo scanning sub-system for translating the subbeams in larger increments to process subsequent features and a piezo scanning sub-system for translating the subbeams in smaller increments to process the area of a feature.

6. The system of claim 1, further comprising an f-theta lens optically coupled to the subbeams and situated to provide the focused subbeams in the same or approximately the same plane at the target across a range of positions transverse to the propagation of the subbeams.

7. The system of claim 6, wherein the dispersion compensation system is situated between the f-theta lens and the target.

8. The system of claim 1, wherein the focus lens is achromatic.

9. The system of claim 1, wherein one or both of the diffractive lenses of the dispersion compensation system correct from chromatic aberration associated with the focus lens.

10. The system of claim 1, wherein the beam splitter is a diffractive optical element.

11. The system of claim 10, wherein the diffractive optical element diffracts the input beam into a two-dimensional array of subbeams.

12. The system of claim 1, wherein a spatial and temporal dispersion introduced by the beam splitter is reduced by the dispersion compensation system for the subbeams received by the target such that the transverse position and size of each subbeam at the target is within 10% of a subbeam array of a predetermined spacing based on a zero order subbeam position and size.

13. The system of claim 1, wherein the zoom lens system includes a plurality of zoom lens optics movably adjustable in the propagation direction of the subbeams.

14. The system of claim 1, wherein the zoom lens system is situated to controllably adjust the subbeam to subbeam spacing at the target.

15. The system of claim 1, further comprising a laser system situated to provide the input beam, the input beam including a series of optical pulses, each optical pulse having a pulse-width of less than about 1000 fs.

16. A multi-beam laser material processing system for processing a target, comprising:

a laser system situated to provide a pulsed input beam, each pulse of the pulsed input beam having a pulse-width of less than about 1000 fs;

a diffractive optical element coupled to the pulsed input beam, the diffractive optical element situated to diffract the pulsed input beam into a plurality subbeams for focusing at the target into a plurality spots forming a two-dimensional subbeam array;

a zoom lens coupled to the diffracted pulsed input beam and situated to controllably adjust the magnification of the subbeam array, the zoom lens including a dispersion compensation system situated to receive the diffracted pulsed input beam and correct for dispersion effects introduced into the subbeam array by the diffractive optical element, the dispersion compensation system including a focus lens for causing the diffracted pulsed input beam to converge and a negative diffractive lens and positive diffractive lens pair for correcting the dispersion effects;

a scanning system coupled to the diffracted pulsed input beam and situated to controllably translate the subbeam array transverse to the direction of subbeam propagation at the target; and an f-theta lens coupled to the scanned diffracted pulsed input beam and situated to focus the subbeam array at the target across a range of positions transverse to the direction of subbeam propagation.

17. The system of claim 16, wherein a distortion associated with the subbeams that is separate from the dispersion is corrected through an aspheric feature applied to one or more of the dispersion compensation system focus lens, negative diffractive lens, or positive diffractive lens.

18. A method of multi-beam laser material processing a target, comprising:

generating a pulsed laser beam suitable for femtosecond laser material processing with a laser system configured to produce pulses of the pulsed laser beam with a pulse-width of less than about 1000 fs;

diffracting the pulsed laser beam to form a spaced subbeam array of femtosecond laser spots at the target with a diffractive optical element;

magnifying or demagnifying the diffracted pulsed laser beam to controllably adjust the size of the subbeam array at the target with a zoom lens, the zoom lens including a dispersion compensation system, the dispersion compensation system including a focus lens, a negative diffractive lens, and a positive diffractive lens;

compensating for subbeam dispersion causing a subbeam ellipticity at the target with the dispersion compensation system;

compensating for subbeam distortion causing a subbeam translation at the target in relation to the diffraction order of the translated subbeam with the dispersion compensation system; and scanning the diffracted pulsed laser beam across the target with a scanning system and an f-theta lens in order to parallel laser process a pattern with a predetermined spacing at the target.

19. The method of claim 18, wherein the compensating for subbeam distortion includes a lens correction applied to one or more of the focus, negative diffractive, or positive diffractive lenses associated with the subbeam dispersion compensation.

20. The method of claim 18, wherein the scanning of the diffracted pulsed laser beam is piezo-scanned for small increment laser processing of a feature in the subbeam array and is galvo-scanned for large increment translation of the subbeam array to an adjacent location to small increment laser process a subsequent feature.

* * * * *